United States Patent
Hyodo et al.

(10) Patent No.: US 9,606,902 B2
(45) Date of Patent: Mar. 28, 2017

(54) MALFUNCTION INFLUENCE EVALUATION SYSTEM AND EVALUATION METHOD USING A PROPAGATION FLAG

(75) Inventors: Akihiko Hyodo, Tokyo (JP); Yasuo Sugure, Tokyo (JP); Yasuhiro Ito, Tokyo (JP); Tetsuya Yamada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 14/404,844

(22) PCT Filed: Jul. 3, 2012

(86) PCT No.: PCT/JP2012/067006
§ 371 (c)(1),
(2), (4) Date: Jan. 7, 2015

(87) PCT Pub. No.: WO2014/006693
PCT Pub. Date: Jan. 9, 2014

(65) Prior Publication Data
US 2015/0121148 A1    Apr. 30, 2015

(51) Int. Cl.
*G06F 11/36* (2006.01)
*G05B 19/042* (2006.01)
*G05B 23/02* (2006.01)

(52) U.S. Cl.
CPC ...... *G06F 11/3688* (2013.01); *G05B 19/0428* (2013.01); *G06F 11/3636* (2013.01);
(Continued)

(58) Field of Classification Search
CPC ............ G06F 11/3624; G06F 11/3636; G06F 11/3644; G06F 11/3664
See application file for complete search history.

(56) References Cited

U.S. PATENT DOCUMENTS 5,842,202 A * 11/1998 Kon ................... G06F 11/0727
2001/0056530 A1   12/2001 Harris
(Continued)

FOREIGN PATENT DOCUMENTS

| JP | 10-307609 | 11/1998 |
| JP | 2000-235491 A | 8/2000 |
| WO | WO 2006/117833 A1 | 9/2006 |

OTHER PUBLICATIONS

PCT International Search Report on application PCT/JP2012/067006 mailed Sep. 18, 2012; 2 pages.

*Primary Examiner* — Joseph Schell
(74) *Attorney, Agent, or Firm* — Foley & Lardner LLP

(57) ABSTRACT

Provided is a malfunction influence evaluation system comprising a controller simulator that simulates the operation of a controller, an input apparatus that provides input data to the controller simulator, a simulation manager that exercises integrated management of the operation of the input apparatus and the controller simulator, and a database wherein malfunction information and simulation conditions to be referred to by the simulation manager is stored. The controller simulator retains a control program for the controller and an analysis unit, and the analysis unit has a propagation flag tracking function wherein propagation flags are assigned to a variable within the control program, bits of the variable are set by inputting a prescribed value thereto as a malfunction input value, the bits are propagated each time the variable is involved in a calculation within the control program, the states of propagation of the bits are tracked, and the result thereof is output.

16 Claims, 10 Drawing Sheets

(52) U.S. Cl.
CPC ...... *G05B 23/0213* (2013.01); *G06F 11/3644* (2013.01); *G06F 11/3664* (2013.01)

(56) References Cited

U.S. PATENT DOCUMENTS

| | | | | |
|---|---|---|---|---|
| 2005/0022170 A1* | 1/2005 | Brown | ................ | G06F 11/3664 717/125 |
| 2005/0283685 A1* | 12/2005 | Emer | ................. | G06F 9/30145 714/48 |
| 2006/0112373 A1* | 5/2006 | Rokosz | .............. | G06F 11/3664 717/125 |
| 2008/0086295 A1 | 4/2008 | Okada et al. | | |
| 2008/0155324 A1* | 6/2008 | Gooding | ............ | G06F 11/0724 714/25 |
| 2011/0035802 A1* | 2/2011 | Arajujo, Jr. | ........... | G06F 11/079 726/23 |
| 2012/0198284 A1* | 8/2012 | Li | ........................ | G06F 11/362 714/42 |
| 2012/0304026 A1* | 11/2012 | Khanna | .............. | G06F 11/0715 714/57 |
| 2013/0159778 A1* | 6/2013 | Yabuki | ................ | G06F 11/0751 714/37 |

\* cited by examiner

F I G. 4 B
Table:
ORIGINAL VARIABLE DEFINITION EXAMPLE 450
|  | X1 | ... | Xn |
|---|---|---|---|
| VALUE | 10 | ... | 5 |
Table:
CONVERTED VARIABLE DEFINITION EXAMPLE 460
|  | X1 | ... | Xn |
|---|---|---|---|
| VALUE(val) | 10 | ... | 5 |
| PROPAGATION FLAG(flg) | false | ... | true |
| PROPAGATION SOURCE ID(src) | null | ... | 1 |
| PROPAGATION DESTINATION ID(dst) | null | ... | 5 |
| PROPAGATION TIME(time) | null | ... | 100 |
| ... | ... | ... | ... |

F I G. 5 A

```
typedef struct {
    int    val
    bool   flg
    char   src
    char   dst
    int    count
    int    time
    ...
} _packet ;

_packet X1,..., Xn ;
```

500

F I G. 5 B

Table:
MALFUNCTION INFORMATION
DEFINITION EXAMPLE       510

|  | F1 | ... | Fn |
|---|---|---|---|
| MALFUNCTION VALUE(val) | 10 | ... | 5 |
| PROPAGATION TRIGGER(flg) | true | ... | true |
| MALFUNCTION ID(src) | 1 | ... | n |
| INPUT DESTINATION ID(dst) | 5 | ... | 10 |
| INJECTION TIME(time) | 10 | ... | 15 |
| ... | ... | ... | ... |

MALFUNCTION INFLUENCE EVALUATION SYSTEM AND EVALUATION METHOD USING A PROPAGATION FLAG

TECHNICAL FIELD

The present invention relates to malfunction influence evaluation systems, and more particularly, to a malfunction influence evaluation system and evaluation method suitable for influence evaluation and for testing fail-safe operation in the case of a hardware malfunction in controllers for such applications as power plant, railway, automobile, and construction machinery, in which high reliability is required.

BACKGROUND ART

By way of background of the art, there is the invention described in Patent Literature 1. The software testing tool for plant control described in Patent Literature 1, includes: an auxiliary storage device 4 that stores a plant control software 2 for installing into a control panel 21 used for controlling a plant 20, and a test program 3 for testing the health of the plant control software 2 by simulating the actual control panel 21; a calculation device 7 for reading the test program 3 out of the auxiliary storage unit 4 to perform a test process; a display device 5 which is an interface between the calculation device 7 and a person; an input device 6 similarly used as an interface; a storage device 8 for storing calculation results and the software; and a printer 9 for printing the calculation results. Further, Patent Literature 1 also discloses a malfunction influence evaluation method. In other words, in the software testing tool for plant control, it is disclosed that the calculation device includes an influence evaluation means for performing influence evaluation, when a malfunctioning part of the controller and equipment is indicated, to determine how far the indicated controller and equipment are affected.

CITATION LIST

PTL 1: Japanese Patent Application Laid-Open No. HEI 10 (1998)-307609

SUMMARY OF INVENTION

Technical Problem

In the evaluation of the influence of malfunction of a controller or other equipment, it may be required to be able to evaluate the propagation status within a control program with respect to the influence, that does not emerge, even if the system operation and data are within normal range. For example, it may be desirable to test by simulation to see whether a certain system (program) that has been developed as an automotive engine controller and confirmed that it works properly, can be applied as it is or by changing some of the parameters, to other types of vehicles. However, the operating environment of other types of vehicles is not necessarily the same as the operating environment of the system in the vehicle that has been developed. If the influence of malfunction is tried to be evaluated theoretically, it is difficult to perform an appropriate evaluation because there are too many conditions to be satisfied.

In such a case, it is necessary to evaluate the influence on the control program under a new operating environment, by arbitrarily changing the system operating environment and checking the presence or absence of the influence of malfunction that does not emerge by a simulator as a test tool of the control program, in order to develop a system with high reliability.

In the malfunction influence evaluation method of Patent Literature 1, for example, it is possible to evaluate the emerging influence such as an abnormality in the operation and data of the system. However, Patent Literature 1 does not disclose an evaluation means to determine how a malfunction input is propagated within the control program when the influence does not emerge, namely, the system operation and data are within normal range.

The purpose of the present invention is to provide a malfunction influence evaluation system and evaluation method that can evaluate how a malfunction input is propagated within a program in which the system operation and data are within normal range and the malfunction does not emerge, and can also analyze the influence of potential malfunction.

Solution to Problem

The following is a typical example of the present invention. A malfunction influence evaluation system includes: a controller simulator for simulating the operation of a controller; an input device for providing input data to the controller simulator; a simulation manager for integrally managing the execution of the input device and the controller simulator; and a database for storing the malfunction information that the simulation manager refers to and the simulation conditions. The controller simulator has a control program of the controller and an analysis unit thereof. The analysis unit has a propagation flag tracking processing function for providing a propagation flag to a variable within the control program, setting a bit by inputting predetermined values respectively as malfunction input values to the variable, propagating the bit each time the variable is involved in the calculation within the control program, tracking the propagation status of the bit, and outputting the result.

Advantageous Effects of Invention

According to the present invention, it is possible to evaluate how a malfunction input is propagated within a control program, in which the system operation and data are within normal range and the malfunction does not emerge. Thus, by also analyzing the influence or potential malfunction, it is possible to achieve a control system with higher reliability.

BRIEF DESCRIPTION OF DRAWINGS

FIG. 4B is a specific example of the variable definition before and after the incorporation of the analysis program;

FIG. 5A is a specific example of a malfunction database;

FIG. 5B is an example of the definition of malfunction information;

DESCRIPTION OF EMBODIMENTS

The following is an example of en embodiment of the present invention. That is, there is provided a malfunction influence evaluation system including: a controller simulator which is a simulator for a controller including a ROM for storing a control program, a CPU for performing a calculation, a RAM for storing data and an I/O of an external interface, to simulate the operation of the controller, in which an analysis program for generating data required for an analysis of the execution result of the simulation is stored in the ROM of the simulator, in addition to the control program; an input device for providing input data to the controller simulator; a simulation manager for integrally managing the execution of the input device and the controller simulator; and a database for storing the malfunction information that the simulation manager refers to and the simulation conditions. The malfunction influence evaluation system has the analysis program for providing its to variables within the control program, setting a bit by inputting a predetermined value to a specific variable, propagating the bit when the particular bit is involved in the calculation within the control program, and outputting the particular bit.

The present invention can be applied to controllers in various applications such as power plant, railway, automobile, and construction machinery. Further, the present invention can also be applied to the infrastructure of IT equipment such as server and storage.

Hereinafter, embodiments of the present invention will be described with reference to the accompanying drawings.

Example 1

An embodiment of the present invention will be described with reference to FIG. 1 to FIG. 8.

Figure 1:
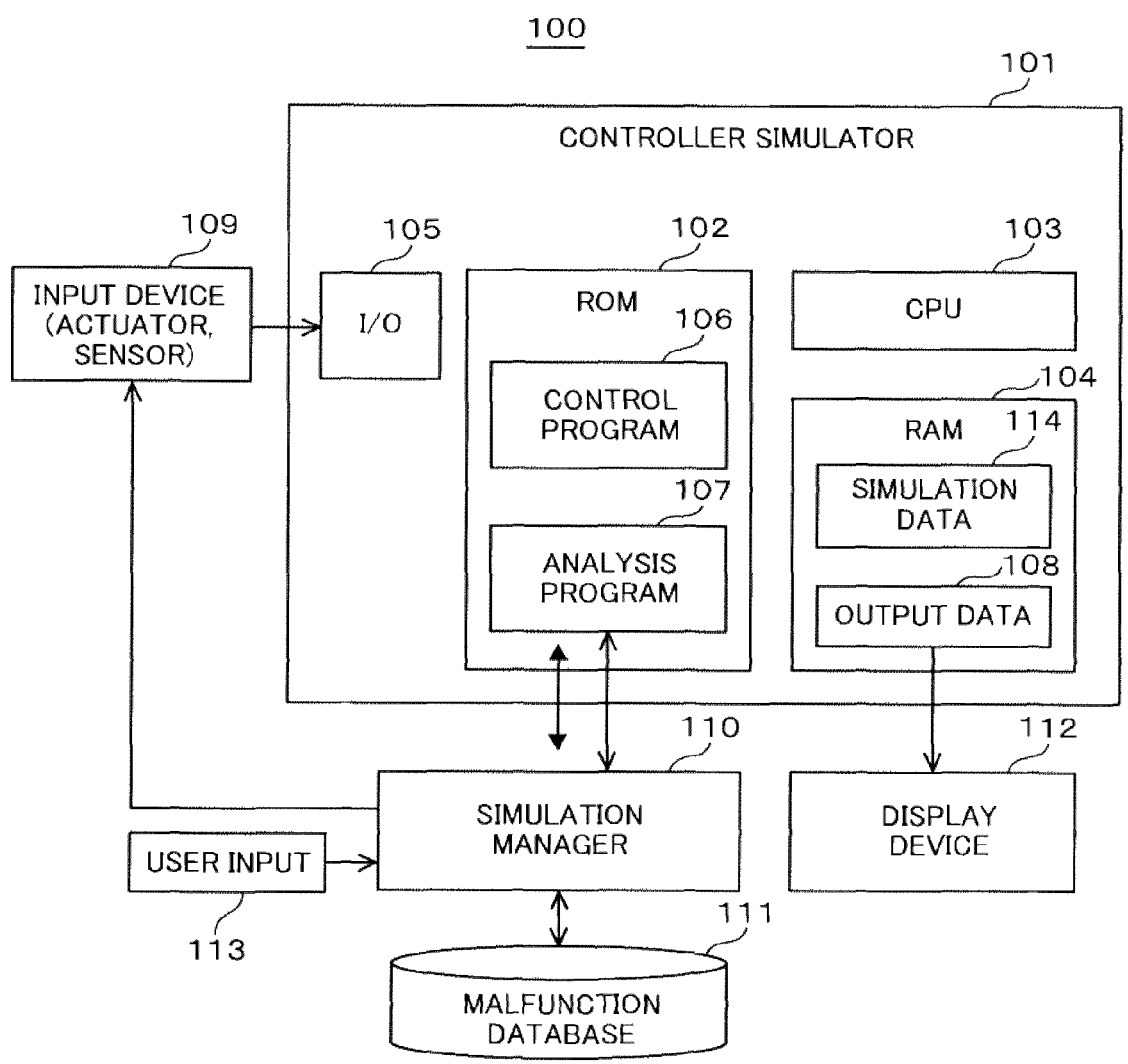
FIG. 1 an example of a block diagram of a malfunction influence evaluation system according to Example 1 of the present invention.

FIG. 1 is an example of a block diagram of a malfunction influence evaluation system 100 according to one embodiment for carrying out the present invention. The malfunction influence evaluation system 100 includes a controller simulator 101, an input device 109, a simulation manager 110 for integrally managing the execution of the input device and the controller simulator, and a display device 112. The controller simulator 101 is a simulator for simulating the operation of a controller (not shown) for controlling an actual device. The input device 109 simulates an actual actuator and sensor to generate an external input for the controller simulator 101 based on an instruction from the controller simulator 101.

The malfunction influence evaluation system 100 is achieved, for example, when the controller simulator 101 is implemented with a server and other devices are connected to the server through a communication network. The malfunction influence evaluation system 100 may be configured as a wide-area network distribution system including servers and terminals.

Note that the controller whose operation is simulated by the controller simulator is, for example, an automotive engine controller. Further, the hardware whose operation is simulated by the input device 109 is for example, a motor for controlling the opening degree of the throttle valve of the engine, a sensor for detecting the angle, and the like. The controller includes at least a ROM (Read Only Memory) for storing the control program, a CPU (Central Processing Unit) for performing a calculation, a RAM (Random Access Memory) for storing data, and an I/O (Input Output Interface) which is an external interface. Thus, the controller simulator 101 also includes at least a ROM 102 for storing a control program 106 and an analysis program 107, a CPU 103 for performing a calculation according to the control program 106, a RAM 104 for storing data such as calculation results, and an I/O 105 which is an interface for importing external inputs, for example, such as analog data of a sensor as well as digital date from digital equipment, into the controller. The analysis program (analysis unit) 107 is used for generating data required for the analysis of the execution result of the simulation. In other words, the analysis program analysis unit) 107 has a propagation flag tracking processing function for inputting respective predetermined values (first value, second value, and so on) to a specific variable or all the variables within the control program 106 to set a propagation flag, propagating the propagation flag sequentially each time the variable is involved in the calculation within the control program, and outputting the propagation status. In this way, it is possible to track the propagation status of a specific variable within the control program. Further, the analysis program also includes a processing function for providing a bit string including the number of propagation times, the propagation time, the information of the propagation path such as the propagation source and the propagation destination, and the like, to the variable as an identifier in addition to the propagation flag.

The RAM 104 stores various types of data 114 involved in the simulation execution, as well as output data 108 of the simulation results.

The I/O 105 is connected to the input device 109, and can proceed with the execution of the simulation, with an instruction from the simulation manager 110 as a trigger, while performing synchronous communication and a process for importing external inputs between the input device 109 and the controller simulator 101.

The input device 109 simulates the hardware (actual device such as actuator, sensor, and circuit). The input device 109 outputs the simulated values corresponding to the response of the actual device, upon execution of the simulation by the CPU 103.

The analysis conditions, for example, such as operating environment are input to the simulation manager 110 from a user input terminal 113. Further, the simulation manager 110 can access a malfunction database 111 that stores the malfunction information and simulation conditions required for the simulation of the malfunction status. The simulation manager 110 can also simulate the influence of malfunction by proving a malfunction value to the input device 109 based on the information stored in the malfunction database 111. Further, the simulation manager 110 has a function for instructing the simulation conditions as well as a function for instructing the content of the output data 108 of the simulation results, through the analysis program 107 stored in the ROM 102 of the controller simulator 101. The display device 112 has an image processing function for visualizing the content of the output data 108 to display on a screen. In this way, the output data 108 of the performed simulation results can be displayed by the display device 112, in a form such as a graph in which the data can be visually checked. The user can monitor the simulation results of the influence of malfunction by operating the simulation manager 110.

Note that, similar to the controller simulator 101, the input device 109 and the simulation manager 110 are, for example, realized by a computer and a program running on the computer.

Here, a specific configuration example of the control program 106 and the analysis program 107 will be described with reference to FIG. 2 and FIG. 3.

Figure 2:
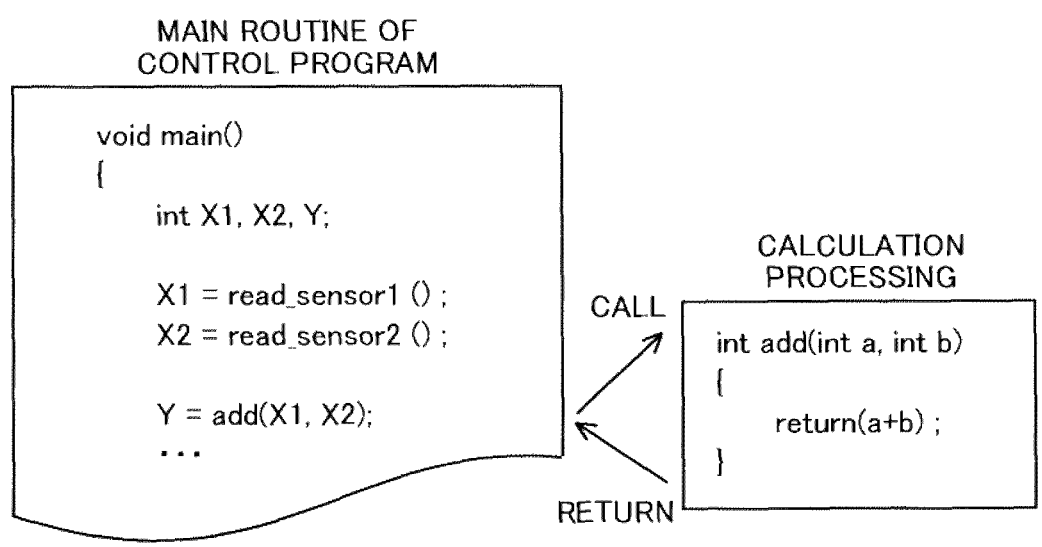
FIG. 2 is an example of a control program for reading and calculating sensor data.

FIG. 2 is an example of one of the various control programs stored in the ROM 102 of FIG. 1, which is an example of the control program for reading and calculating the sensor data. FIG. 2 shows an example of the program description of the main routine of the control program as well as the calculation process called from the main routine. In the description content, the control program includes the following process: reading input values (variables a and b) from the sensor and assigning the input values to the integer type variables X1 and X2, summing the results by the calculation process add( ) of a subroutine, and assigning the sum to the variable Y.

Figure 3:
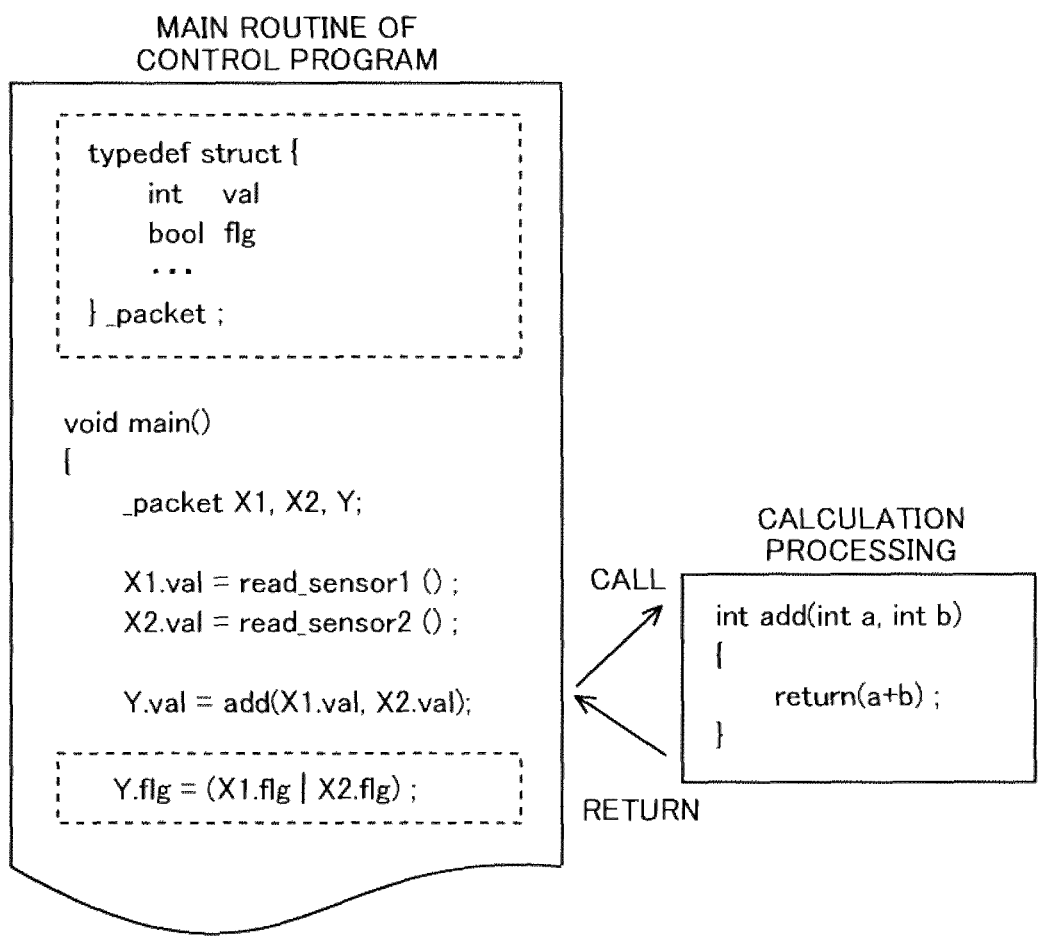
FIG. 3 is an example of a control program in which an analysis program is incorporated into the control program of FIG. 2.

FIG. 3 shows a description example of a control program (for analysis) when the analysis program 107 is incorporated into the (original) control program (FIG. 2) of the analysis target on which a series of these processes is performed, by the simulation manager 110.

The areas shown by dashed lines in FIG. 3 are the newly incorporated parts. In the control program of FIG. 3, the newly added program parts are collectively referred to as the analysis program 107. In the control program (for analysis) of FIG. 3, a new data array _packet, which is not present in the (original) control program in FIG. 2, is first defined as a structure (struct). The structure may include multiple information such as an integer type variable val and a pool type variable flg. Thus, the substitution value to int type variables X1 and X2 in FIG. 2 is changed to int type variable vol within _packet. Here, there is no need to change the calculation process add( ) of the subroutine.

Further, the bool type variable fit within _packet is defined such that, for example, the initial value is set to false and each flg is set to true for all the variables involved in the calculation so as to be able, to track the propagation of the sensor input, which is hereinafter referred to as the propagation flag. However, it may also be possible to set a propagation flag with complex propagation conditions combined with other conditions in addition to the involvement in the calculation. An example of such conditions is given as follows: the involvement in the calculation && the variable value being X or less.

Note that the variable to which the propagation flag is set also includes the return value of the function, the set value of the CPU resister, and the like.

As described above, it is desirable to use the same data type (_packet) as the data type of the variable within the (basic) control program also for the malfunction input value by the analysis program, so that the logic variable of the propagation trigger that is true for all the malfunction input values is used separately from the propagation flag. The propagation flag is used for all the variables or for a specific variable within the program. The propagation flag is true or false depending on the presence or absence or propagation. In this way, for example, as shown in FIG. 3, it is possible to track the propagation of the input data by logical operations, such as "Y.flg=(X1.flg|X2.flg)", and by bit operations.

In other words, it is possible to check whether the variable is propagated based on whether the flg (propagation flag) of the variable is true or false.

For example, when it is desirable to test by simulation to see whether the program, which has been developed as an automobile engine controller, can also be applied to other types of vehicles, some or all of the variables are evaluated to analyze the influence of the potential malfunction of the program. On the other hand, when it is desirable to test by simulation to see whether the program can also be applied to other vehicles of the same type in which the specification of a specific actuator is slightly different, some of the variables involved in the function of different specification is evaluated in order to analyze the influence of the potential malfunction of the program. It is possible to determine whether the program can also be applied to other vehicles or other types of vehicles based on such analysis results. Similarly, even if the program is still being developed, it is possible to evaluate whether the program can also be applied to other vehicles or other types of vehicles, to the extent that it is proved that there is no influence of malfunction.

Figure 4A:
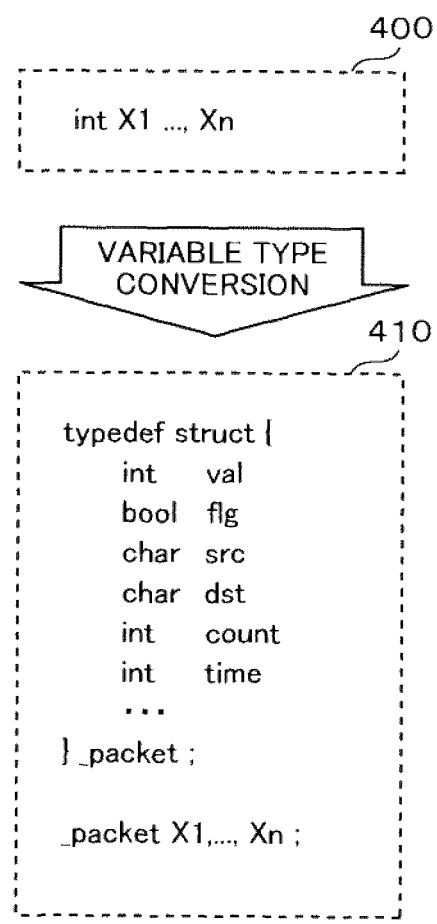
FIG. 4A is an example of variable type conversion to incorporate the analysis program into the control program.

FIG. 4A is a specific example of the variable type conversion in which an analysis program (410) is incorporated into an (original) control program (400) to obtain a control program for analysis). In FIG. 4B, reference numeral 450 denotes an example of the original variable definition before the incorporation of the analysis program, and reference numeral 460 denotes an example of the variable definition after the incorporation conversion of the analysis program. Here, taking int type variables X1, . . . , Xn defined in the original control program (400) as an example, it is assumed that the values of X1=10, Xn=5 are assigned as variables. When the analysis program is incorporated (410) with respect to these variables, the int type variables should be converted into the structure _packet. As shown in FIG. 4D, in addition to the information of the value (val) that _packet has from the beginning, the information such as the propagation flag (flg) showing whether a certain data is propagated, the propagation source ID, namely, the identifier (src) of the variable or function of the propagation source, the propagation destination ID, namely, the identifier (dst) of the variable or function of the propagation destination, and the propagation time (time) can be added to _packet. In addition, the definition of the external I/O, and the like, can also be added. When propagation actually occurs, the propagation flag is changed to true from false as shown in the configuration example of Xn, and values are assigned to the propagation source identifier, the propagation destination identifier, and the propagation time, respectively. Note that the process of assigning these values is included in the function of the analysis program 107.

Reference numeral 500 of FIG. 5A denotes a specific example of the malfunction database 111, and reference humeral 510 of FIG. 5B denotes an example of the definition of the malfunction information. Here, the same structure _packet as that used in FIG. 4A and FIG. 4B can be used also in the definition of the malfunction information. However, the meanings of the respective values are as follows. First, val represents the malfunction value, and flg (propagation trigger) is the flag that triggers propagation and is set to true for all the malfunction inputs (F1 to Fn). When the malfunction values are used in the calculation or of operation within the control program, the propagation flag (flg) is true for the calculation result, so that the propagation of the influence of the malfunction value can be tracked. Further, with respect to the malfunction ID (src), individual identifiers (1 to n) are assigned to each of the malfunctions (F1 to Fn). The input destination ID (dst) indicates the identifier of the input destination. In other words, the input destination ID (dst) specifies the input port and the A/D converter in the input to the I/O 155 of the controller simulator 101. The injection time (time) indicates the time for transmitting the malfunction value (val) each of the malfunction inputs (F1 to In) to the I/O 105. The definition of the external I/O such as the sensor, and the like, can also be added to the definition of the malfunction information.

Figure 6:
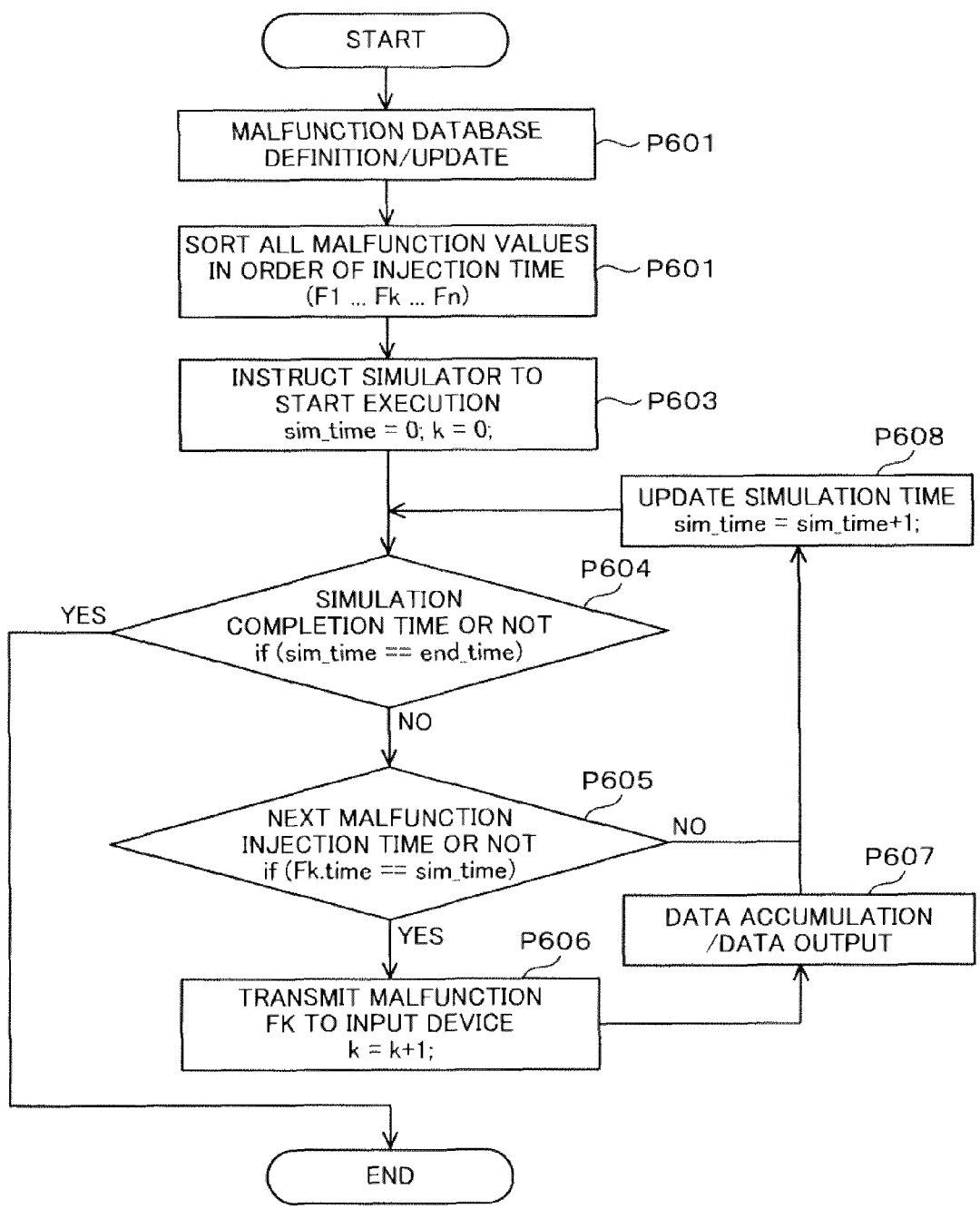
FIG. 6 is an example of the process flow of a simulation manager.

FIG. 6 shows an example of the process flow of the simulation manager 110 when performing a simulation. When the simulation is started, the simulation manager 110 first reads all, the malfunction information 510 defined in the malfunction databased (P601). Then, the simulation manager 110 places all the registered malfunctions (F1 to Fn) in the order of the time (time) at which each malfunction is injected (P602). Once the pre-processing is completed, the simulation manager 110 issues an instruction to the controller simulator 101 to start the simulation (P603). At this time, the simulation time (sim_time) and the identifier (k=malfunction ID) of the malfunctions placed in the injection order is initialized to zero. Next, the simulation manager 110 determines whether the current simulation time is the completion time or not (P604). If the current simulation time matches the completion time the simulation manager 110 ends the simulation. If it is not the completion time, the simulation manager 110 determines whether it is the injection time with respect to the earliest malfunction (Fk) in the injection order (P605). Here, if the simulation time is not the injection time the simulation manager 110 increments and updates the simulation time (sim_time (P608). If the simulation time is the injection time (time), the simulation manger 110 transmits the malfunction Fk to the input device 109, reads the next malfunction in the injection order (P606), and updates the simulation time (P608). By performing a series of the processes described above, the simulation manager 110 can transmit the malfunction information 510 stored in the malfunction database, to the input device 109 at a suitable timing. Note that the transmission status of the malfunction Fk is recorded and is output accordingly, for the purpose of display and the like (P607).

Upon receiving the input of the malfunction Fk each injection time, the input device 109 outputs an output that responds to the input malfunction Fk, to the analysis program 107. In the control program 106, the calculation process of the simulation is performed in response to the output that responds to the malfunction Fk from the input device 109. At the same time, the propagation flag tracking process is performed, using the propagation trigger and the propagation flag. Then, the results are accumulated in a memory as the output data 108 and output from the memory. In other words, the results of the propagation flag tracking process are also stored in the output data 108, together with the simulation results.

Figure 7:
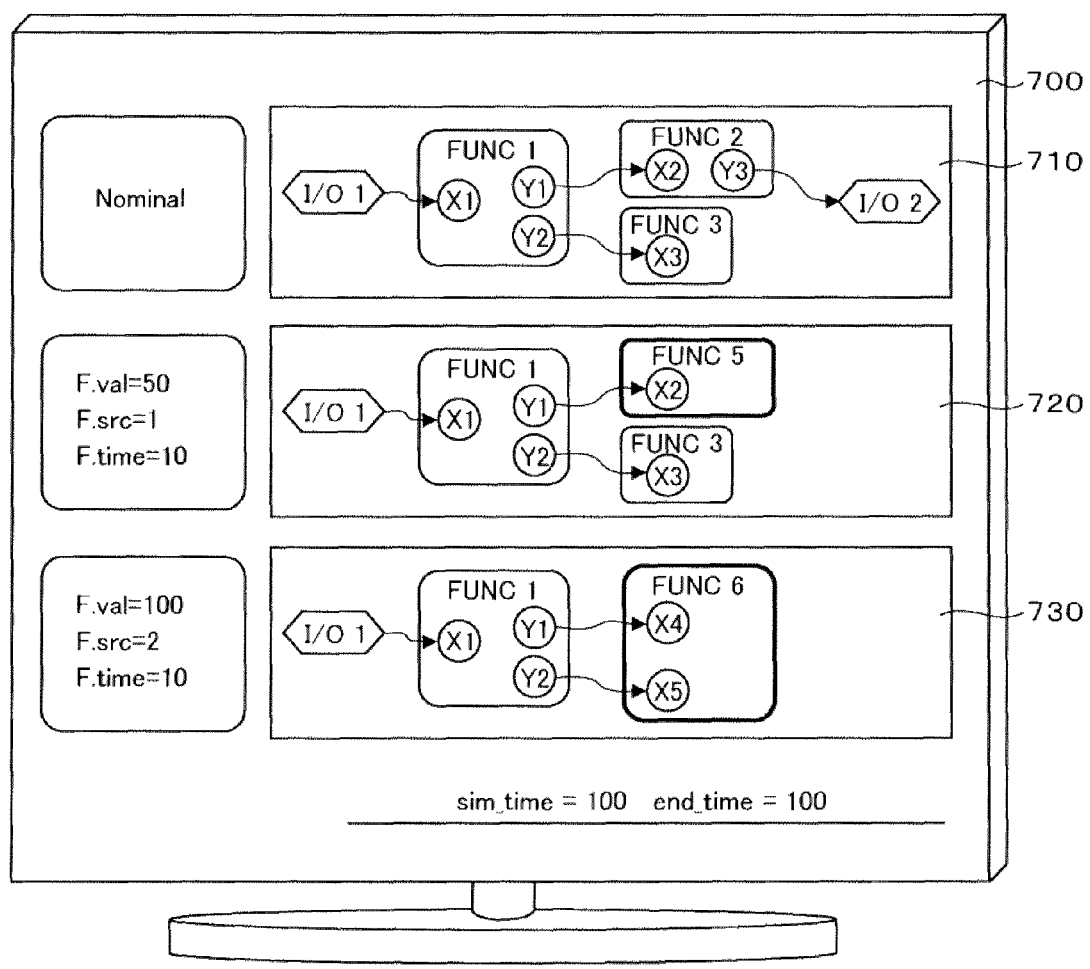
FIG. 7 is an example of a display screen showing the chance in the propagation of a first malfunction value and a second malfunction value.

In FIG. 7, a display 700 displayed in the display device 112 shows the results of performing simulations by inputting two malfunctions (first value and second value) to the control program to be analyzed, respectively, which shows the difference in the propagation between the two malfunctions.

First, a propagation result 710 displayed in the top part of the screen is the propagation status when input values in the normal condition (Nominal), that is, parameters or other variables within the range that satisfies given preconditions, such as design values, are provided to an input port I/O 1. Here, a bit (propagation flag) is given to a specific variable X1 within the control program, and a numbers value (Valu) is input to the specific variable X1 to set a bit (propagation flag). The control program to be analyzed is assumed that the system operation and data are within normal range with respect to the input values in the normal condition, in which the malfunction does not emerge.

When the numbers value (Valu) is in the normal condition, the variable X1 to which the bit (propagation flag is set is involved in the calculation with functions Func 1 and Func 2 within the control program. Then, the variable X1 is propagated to I/O 2 from I/O 1, while changing to variables Y1, X2, and Y3. Further, the variable X1 is involved in the calculation with functions Func 1 and Func 3 within the control program. In this case, the variable X1 is propagated sequentially, while changing to variables Y2 and X3. The data in the normal condition is obtained and recorded as reference information in advance.

Next, a propagation result 720 displayed in the middle part of the screen is the case in which the first value, namely, the malfunction value (val)=50, the malfunction ID (src)=1, and the malfunction injection time (time)=10, is given to the propagation source (ID=1). Then, a propagation result 770 displayed in the bottom part of the screen is the case in which the second value, that is, the malfunction value, (val)=100, is given to the propagation source (ID=2). The injection time is not changed for the first value. The first and second values are parameters or other variables that do not satisfy the given preconditions. These three propagation statuses are graphically displayed on one screen, so that it is possible to check the change in the propagation path as well as the change in the reaching range. For example, from the example displayed in the middle part of the screen, it can be found that when the first value is given as malfunction information, the variable X1 is propagated as the variable X2 of Func 5 as indicated by a thick frame and is not propagated to the I/O 2, although it should have been propagated from the variable Y1 of the function Func 1 to the variable X2 of Func 2. On the other hand, the variable. X1 is propagated from the variable Y2 of the function on 1 to Func 3 as the variable X3. As described above, it can be found that the propagation is affected within the control program by the malfunction information. In other words, the presence of the potential propagation influence can be found by changing the parameters from the value in the normal condition to the malfunction value (first value). However, the influence of the propagation based on the first value could not be concluded to be "a malfunction" immediately. For example, the propagation of the variable X1 from the variable Y1 of the function Func 1 to the variable X2 of Func 5 may be the correct response under such conditions, although a different propagation status appeared with respect to the parameters that were not previously expected. In any case, when a propagation result which is different from the reference information in the normal condition is obtained, it is desirable to output the status and display it in a thick frame or other form to alert the user.

Further, from the example displayed in the bottom part of the screen, it can be found that when the second value is given as malfunction information, the variable X1 is propagated as the variable X4 of Func 6 as indicated by a thick frame and is not propagated to I/O 2, although it should have been propagated from the variable Y1 of the function Func 1 to the function Func 2. Further, the variable X1 is propagated from the variable Y2 to Func 6 as the variable X5. In other words, the presence of the potential propagation influence can be found by changing the parameters from the value in the normal condition to the second value. Further, the propagation result 720 and the propagation result 730 both show that there is a difference in the influence of the malfunction due to the difference between the malfunction input values.

As described above, when the first and second values that are not in the normal condition are given to the input port I/O 1 as malfunction information, it is possible to evaluate how the malfunction inputs are propagated and to check the results on the screen. As a result, the influence of the potential malfunction can also be analyzed.

In this way, when the input value in the normal condition (Nominal) is given to the input port I/O 1, even if the system operation and data are within normal range and the error no not emerged, it is possible to analyze the influence of potential malfunction by evaluating how the malfunction input exceeding the normal range is propagated within the control program. As a result, a highly reliable control system can be achieved.

For example, when it is desirable to check by simulation to see whether the program, which has been developed as en automobile engine controller, can also be an plied to other vehicles of the same type with a slightly different specification such as the total displacement or applied to other types of vehicles, it is possible to analyze the influence of the potential malfunction of the program by inputting the changed precondition parameters to evaluate the propagation of the input. Based on the analysis results, it is possible to determine whether there is a problem in application of the program to other vehicles or other types of vehicles. Also, with respect to a program that is being developed, it is possible to analyze the influence of the potential malfunction of the program by inputting parameters in an unexpected range as precondition to evaluate the propagation of the input, and take measures if necessary. For example, it is possible to understand the influence of the potential malfunction, such as that the responsiveness of the accelerator and brake of a car is reduced and does not meet the precondition, due to a significant change in the parameters.

Figure 8:
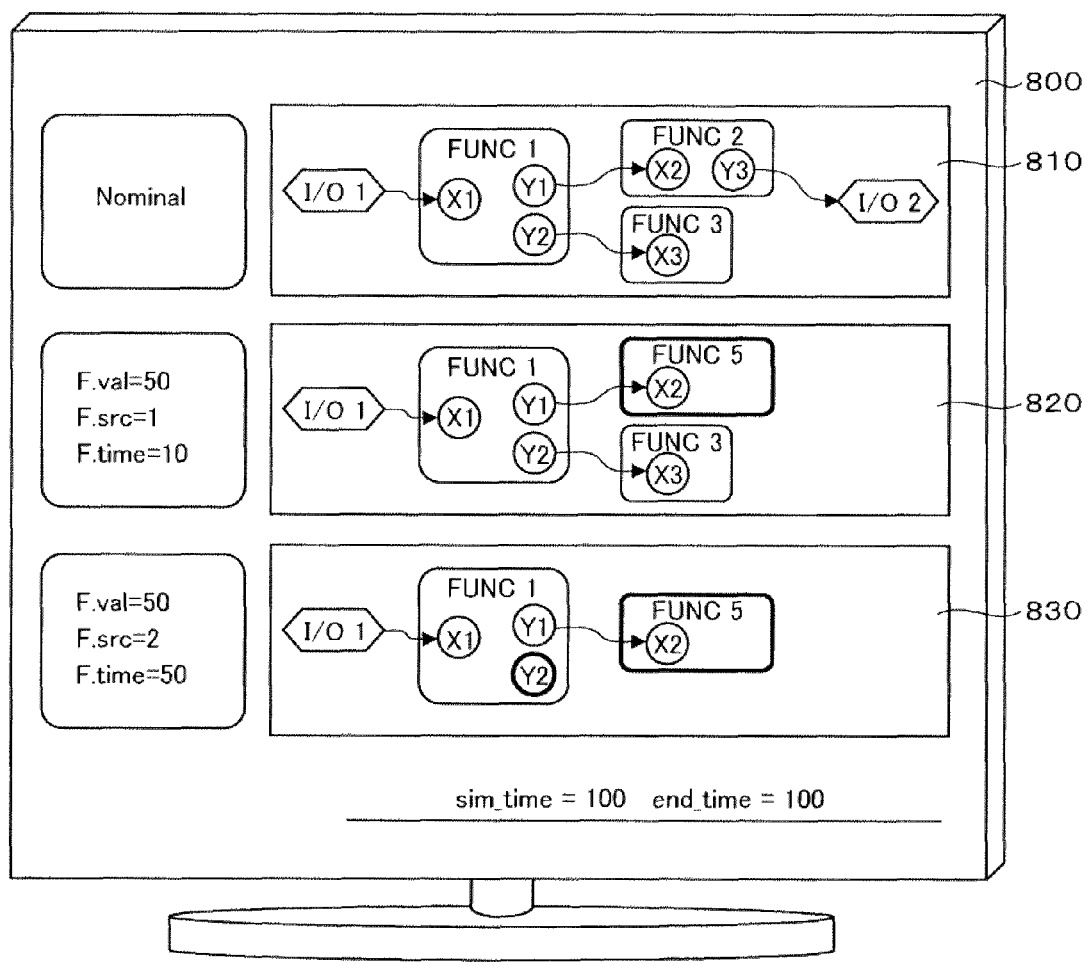
FIG. 8 is an example of a display screen showing the change in the propagation of a first malfunction time and a second malfunction time.

Also the example of FIG. 8, similar to the example of FIG. 7, shows a screen 800 of the display device 112 that displays an example of the simulation results of inputting two malfunctions. Here, the example shows the case in which the malfunction values (val) are the same and the injection times (time) are different from each other. A propagation result 810 displayed in the top part of the screen is the propagation status between Func 1, Func 2, Func 3, and I/O 2 when the input value in the normal condition (Nominal) is given to the input port I/O 1. A propagation result 820 displayed in the middle part of the screen is the case in which the input value of the variable val=50, ID=1, and time=10 is given as malfunction information. In this case, although the malfunction input (variable X1) is propagated from the input port I/O 1 to Func 3 through Func 1, the influence of the malfunction is recognized in the variable X2 (Func 5) as indicated by a thick frame, which shows that the malfunction input is not propagated to I/O 2 from Func 5. Further, a propagation result 830 displayed in the bottom part of the screen shows that the influence of the malfunction can be recognized in the variables Y2 and X2, when the input value of the variable val=50, ID=2, and time=50 is given as malfunction information. The propagation result 820 and the propagation result 830 show that there is a difference in the influence of the malfunction due to the difference in the timing of the malfunction input. For example, it is possible to evaluate what influence is generated when the responsiveness of the actuator and sensor exceeds the range expected for the precondition.

In other words, also in the case of FIG. 8, similar to the example of FIG. 7, when the input, value in the normal condition (Nominal) is given to the input port. I/O 1, in the case in which the system operation and data are within normal range, the propagation path and the reaching range may be changed when the malfunction input exceeding the normal range is given. The user can check this status on the screen and can analyze the influence of the potential malfunction.

As described above, according to the present embodiment, it is possible to evaluate in detail how the malfunction input is propagated within the control program, in which the system operation and data are within normal range and the malfunction does not emerge. Thus, by also analyzing the influence of potential malfunction, it is possible to achieve a control, system with higher reliability.

Example 2

In general, the size of the program to be tested by simulation is very large, so that the number of variables to be given as malfunction conditions, as well as the number of functions associated with the variables are naturally increased. Thus, in order to output the results performing the simulation to the display device 112 more clearly, the simulation manager 110 described in Example 1 may have a filtering function for performing condition determination. The filtering function performs condition determination, such as determining the presence or absence of the propagation to each of the variables and functions, as well as whether it is within the range of tolerance and threshold set in advance to each variable, with respect to the output data 108. Then, the filtering function selects whether to enable or disable the display device 112 to display the propagation path based on the determination result. It is also possible to check the analysis results on the screen. For example, as a result of the condition determination, when the propagation result 720 of FIG. 7 is within the tolerance and the propagation result 730 is out of the tolerance, the filtering function displays "the influence of potential malfunction is present" as the propagation result 730, and does not display any information on the propagation result 720. This can narrow the number of targets that the user should consider, so that it is possible to analyze the propagation status at a higher level. Also, the analysis can be automated and streamlined.

Example 3

As another embodiment of the present invention, the controller simulator 101 itself may have a malfunction simulation function as well as the function of the simulation manager for integrally managing the execution of the controller simulator, and further, the controller simulator 101 may include the malfunction database 111 and the display device 112. With this configuration, there is no need to communicate between the simulation manager and the controller simulator for the pre-processing (P601 to P603 of FIG. 6), and the like, making it possible to reduce the overhead.

Example 4

The present invention can be applied to not only the simulator (microcomputer) of the control program described in Example 1, but also the simulator for simulating the hardware (the input device of Example 1) corresponding to the actual device (actuator). For example, the present invention can be applied to both the microcomputer simulator corresponding to the controller for automotive engine control as well as the simulator (mechanical simulator) which is a model of the engine controlled by the particular controller for engine control.

Figure 9:
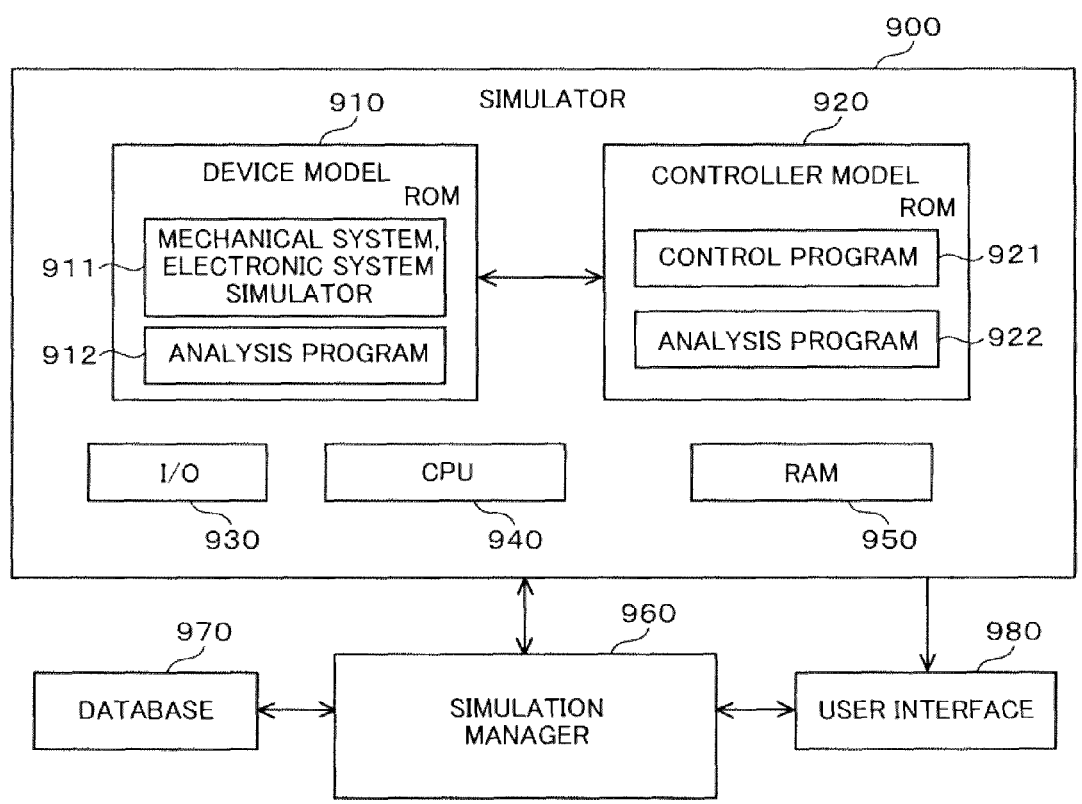
FIG. 9 is en example of a block diagram of a malfunction influence evaluation system according to Example 4 of the present invention.

FIG. 9 shows an example of the configuration of a malfunction influence evaluation system according to Example 4 of the present invention. A malfunction influence evaluation system 900 includes a device model simulator 910 and a microcomputer simulator 920. The device model simulator 910 has a mechanical system/electronic system simulator 911 and an analysis program 912. Further, the microcomputer simulator 920 has a control program 921 and an analysis program 922 that have the same configuration as in Example 1.

Also in the present embodiment, similar to Example 1, it is possible to evaluate how a malfunction input is propagated within the simulator of the actual device model, by injecting malfunction information to a variable, and the like, within the simulator of the actual device model by the analysis program 912. In other words, when the input value in the normal condition is given in the case in which the system operation and data are within normal range, it is possible to achieve a system with higher reliability by analyzing not only the control program but also the influence of the potential malfunction of the actual device model.

For example, when it is desirable to check by simulation to see whether the actuator developed for automotive engine control can also be applied to the vehicles of the same manufacturer and the same type with a slightly different specification, it is possible to analyze not only the control program but also the influence of the potential malfunction of the actuator.

As described above, according to the present embodiment, it is possible to evaluate how the malfunction input is propagated within the control program and the simulator of the actual device model, in which the system operation and data are within normal range and the malfunction does not emerge. Thus, by also analyzing the influence of the potential malfunction, it is possible to achieve a system with higher reliability.

REFERENCE SIGNS LIST

100 . . . malfunction influence evaluation system,
101 . . . controller simulator,
102 . . . ROM (Read Only Memory),
103 . . . CPU (Central Processing Unit),
104 . . . RAM (Random Access Memory),
105 . . . I/O Input Output Interface),
106 . . . control program,
107 . . . analysis program,
108 . . . output data,
109 . . . input device,
110 . . . simulation manager,
111 . . . malfunction database,
112 . . . display device,
700 . . . screen of the display device,
800 . . . screen of the display device,
900 . . . malfunction in evaluation system.

The invention claimed is:

1. A malfunction influence evaluation system comprising:
a controller simulator comprising a processor and a memory, the controller simulator configured to simulate an operation of a controller;
an input device configured to provide input data to the controller simulator;
a simulation manager configured to integrally manage execution of the input device and the controller simulator; and
a database configured to store malfunction information that the simulation manager refers to and simulation conditions,
wherein the controller simulator has a control program of the controller and an analysis unit of the controller, and
wherein the analysis unit has a propagation flag tracking processing function for providing a propagation flag to a variable within the control program, setting a bit by inputting predetermined values, respectively, as malfunction input values to the variable, propagating the bit when the variable is involved in a calculation within the control program, tracking a propagation status of the bit, and outputting a result.

2. The malfunction influence evaluation system according to claim 1,
wherein the analysis unit has a function for providing a bit string including a number of propagation time, the propagation time, and information on a propagation path including a propagation source and a propagation destination, to the variable, as an identifier in addition to the bit.

3. The malfunction influence evaluation system according to claim 2,
wherein the analysis unit has a function for providing a propagation trigger which is a logic variable that differs from the propagation flag, to the variable in addition to the bit,
wherein the propagation trigger is true for all the malfunction input values, and
wherein the propagation flag is used for at least one variable within the control program, the propagation flag being true of false depending on a presence or an absence of the propagation.

4. The malfunction influence evaluation system according to claim 2,
wherein the input device is hardware or software for simulating the operation of an actual device to be controlled by the controller, and
wherein the input device generates an external input for the controller simulator based on an instruction from the controller simulator.

5. The malfunction influence evaluation system according to claim 4,
wherein the database includes information of malfunction values to be tested, input destination I/O, and input time, and
wherein the simulation manager refers to the database to determine content of the instruction to the input device.

6. The malfunction influence evaluation system according to claim 5,
wherein the simulation manager determines a timing of an input of the malfunction input values to the input device, by condition determination at run time based at least in part on an execution status of the controller simulator.

7. The malfunction influence evaluation system according to claim 6,
wherein the malfunction influence evaluation system performs a simulation in the controller simulator with first and second values input from the input device, and displays a difference in the propagation path of the bit as a result of the simulation.

8. The malfunction influence evaluation system according to claim 2, wherein the malfunction influence evaluation system comprises a display device controlled by the simulation manager, for displaying output data of the controller simulator, and wherein, with respect to the variable, the display device has a function for displaying a function involved in the calculation within the control program as well as the propagation status of the bit associated with the calculation, on a screen.

9. The malfunction influence evaluation system according to claim 1, wherein the analysis unit has a filtering function for performing condition determination which includes determining a presence or an absence of the propagation to variables and functions, as well as whether it is within a range of tolerance and threshold set in advance for each of the variables.

10. The malfunction influence evaluation system according to claim 9, wherein the malfunction influence evaluation system comprises a display device controlled by the simulation manager, for displaying output data of the controller simulator, and wherein the simulation manager selects whether to enable or disable the display device to display a propagation path based on a result of the condition determination.

11. The malfunction influence evaluation system according to claim 1, wherein the controller includes a first ROM for storing a control program, a first CPU for performing a calculation, a first RAM for storing data, and a first I/O which is an external interface, and wherein the controller simulator for simulating the operation of the controller includes the processor and the memory, wherein the memory includes a second ROM for storing the control program and an analysis program implementing the analysis unit, the processor includes a second CPU for performing a calculation according to the control program, and the memory further includes a second RAM for storing data including calculation results, and wherein the controller simulator further includes a second I/O which is an interface for importing external inputs into the controller.

12. The malfunction influence evaluation system according to claim 1, wherein the controller simulator has a malfunction simulation function, a function of the simulation manager, a malfunction database, and a display device.

13. A malfunction influence evaluation system comprising:

a CPU;

a memory;

a microcomputer simulator configured to simulate an operation of a controller;

a mechanical simulator configured to simulate an operation of an actuator to be controlled by the controller;

an input device configured to provide input data to the microcomputer simulator and the mechanical simulator;

a simulation manager configured to integrally manage execution of the input device, the microcomputer simulator, and the mechanical simulator; and a database configured to store malfunction information that the simulator manager refers to and simulation conditions, wherein the microcomputer simulator and the mechanical simulator respectively have a control program and an analysis unit, wherein the CPU performs a calculation according to a control program stored in the memory, and wherein the analysis unit has a propagation flag tracking processing function for providing a propagation flag to a variable within the control program, setting a bit by inputting predetermined values respectively as malfunction input values to the variable, propagating the bit when the variable is involved in the calculation according to the control program, tracking a propagation status of the bit, and outputting a result.

14. An evaluation method using a malfunction influence evaluation system, wherein the malfunction influence evaluation system comprises:

a controller simulator configured to simulate an operation of a controller;

an input device configured to provide input data to the controller simulator;

a simulation manager configured to integrally manage execution of the input device and the controller simulator; and a database configured to store malfunction information that the simulation manager refers to and simulation conditions, wherein the controller simulator has a control program of the controller and an analysis unit of the controller, wherein the evaluation method includes the steps of:

providing a propagation flag to a variable within the control program;

setting a bit by inputting predetermined values respectively as malfunction input values to the variable;

propagating the bit when the variable is involved in a calculation within the control program;

tracking a propagation status of the bit; and outputting a result.

15. The evaluation method according to claim 14, wherein the analysis unit has a function for providing a propagation trigger which is a logic variable that differs from the propagation flag, in addition to the bit, wherein the propagation trigger is true for all the malfunction input values, and wherein the propagation flag is used for at least one variable within the control program, the propagation flag being true or false depending on a presence or an absence of the propagation.

16. The evaluation method according to claim 14, wherein the malfunction influence evaluation system comprises a display device controlled by the simulation manager, for displaying output data of the controller simulator, and wherein the malfunction influence evaluation system performs a simulation in the controller simulator with first and second values input from the input device, and displays a difference in a propagation path of the bit as a result of the simulation, on the display device.

* * * * *